C. L. TUCKER.

Package for Holding and Shipping Lard.

Reissued July 14, 1868.

No. 3,039.

Witnesses

Inventor

Charles L. Tucker

N. PETERS, Photo-Lithographer, Washington, D. C.

UNITED STATES PATENT OFFICE.

CHARLES L. TUCKER, OF CHICAGO, ILLINOIS.

IMPROVED PROCESS OF PUTTING UP LARD FOR STORAGE AND TRANSPORTATION.

Specification forming part of Letters Patent No. 66,268, dated July 2, 1867; Reissue No. 3,039, dated July 14, 1868.

*To all whom it may concern:*

Be it known that I, CHARLES L. TUCKER, of the city of Chicago, in the county of Cook and State of Illinois, have invented certain new and useful Improved Packages for holding and Shipping Lard; and I do hereby declare that the following is a full, clear, and exact description thereof, so far as this subdivision is concerned, reference being had to the accompanying drawings, making a part of this specification, in which—

Figure 1:
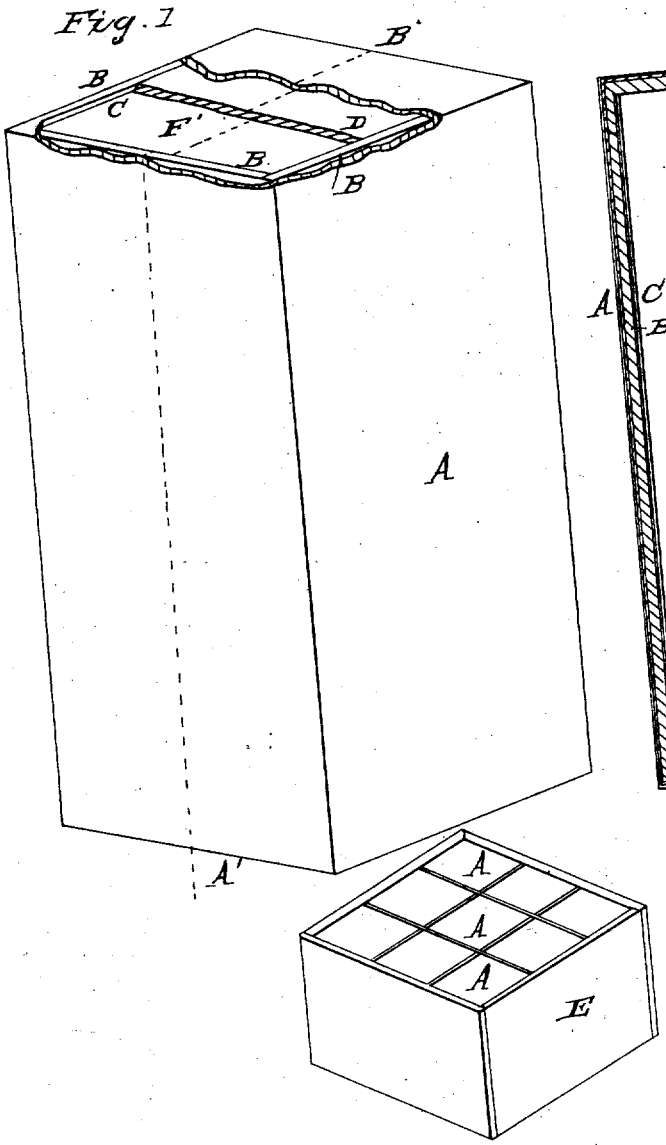
Figure 2:
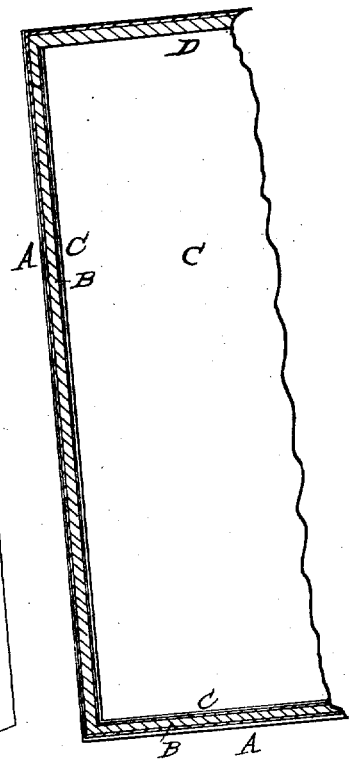

Figure 1 is a perspective view of a single package with a portion of the top removed; Fig. 2, a vertical section, showing one side and a portion of the ends of the same; and Fig. 3, a perspective or isometric view of a packing or case inclosing a number of packages.

Lard as packed in tierces, barrels, kegs, tubs, or pails in shipping is exposed to the direct rays of the sun upon the wood of the package, and is subject to loss from absorption and leakage, and in warm weather or places is subject to similar loss when not so exposed, and as so packed it is unprofitable and very inconvenient for retailing. Lard is at times packed in tin; but the excessive cost of metallic packages causes its use to be limited, as they are too expensive for small packages, besides being inconvenient in packing and in opening to get the lard out.

My invention consists in overcoming these difficulties by providing small tight packages, made of wood or paper, or partly of both, for holding the lard, and of a varying capacity of from one to ten pounds, or even more, suitable for retailing without breaking the original package, and also so constructed as that there shall be no projecting lid or cover to interfere with compact packing or to injure adjoining packages when placed together for shipment, and in forming such small packages or caddies into a single package for shipment, so that there will be separate wood or paper casings interposed between the lard and the outer casing, and also a small air-space between them, which will prevent the action of the sun upon the inner packages.

To enable others skilled in the art to make and use my improved packages, I will proceed to describe the same.

I construct my small boxes or caddies square in form for economy of space; but they may, however, be made round upon the same principle. The small packages are usually made of thin strips of wood cut from steamed blocks, or of veneers, which can be cut or sawed in any machine suitable for cutting veneers, and they may be made of common paste or straw board. The particular mode of construction, &c., deemed best in the art will be found more fully described in the other divisions of this reissue.

These small packages A′ are then packed in neatly-fitting cases E, thus securing a double package of wood, or wood and paper, which in transportation will counteract or avoid the action of the direct rays of the sun and the influence of heat upon the wood or paper of the packages with which the lard is in contact, which is the principal cause of absorption by and leakage of the packages heretofore used for shipping purposes, for the reason that any division in the packages, however slight, stops the penetration of heat; and when such spaces or divisions of the wooden packages have in them a still further division or lining of paper, (as I usually give the small packages an exterior paper covering when of wood,) which is a non-conductor as well as the air in the space, the insulation of the inner packages which contain the lard is complete, and scarcely any waste occurs in shipping or storing.

Having thus fully described this part of my invention, what I claim as new in this subdivision, and desire to secure by Letters Patent, is—

The mode herein described of packing lard for transportation or storage by first packing the lard in separate small packages of light wood or paper and inclosing such small packages in an outer close-fitting case, substantially as specified.

CHARLES L. TUCKER.

Witnesses:
L. L. BOND,
E. A. WEST.